July 21, 1953
G. A. COLTON
2,646,064
VALVE APPARATUS
Filed Dec. 29, 1944
3 Sheets-Sheet 1
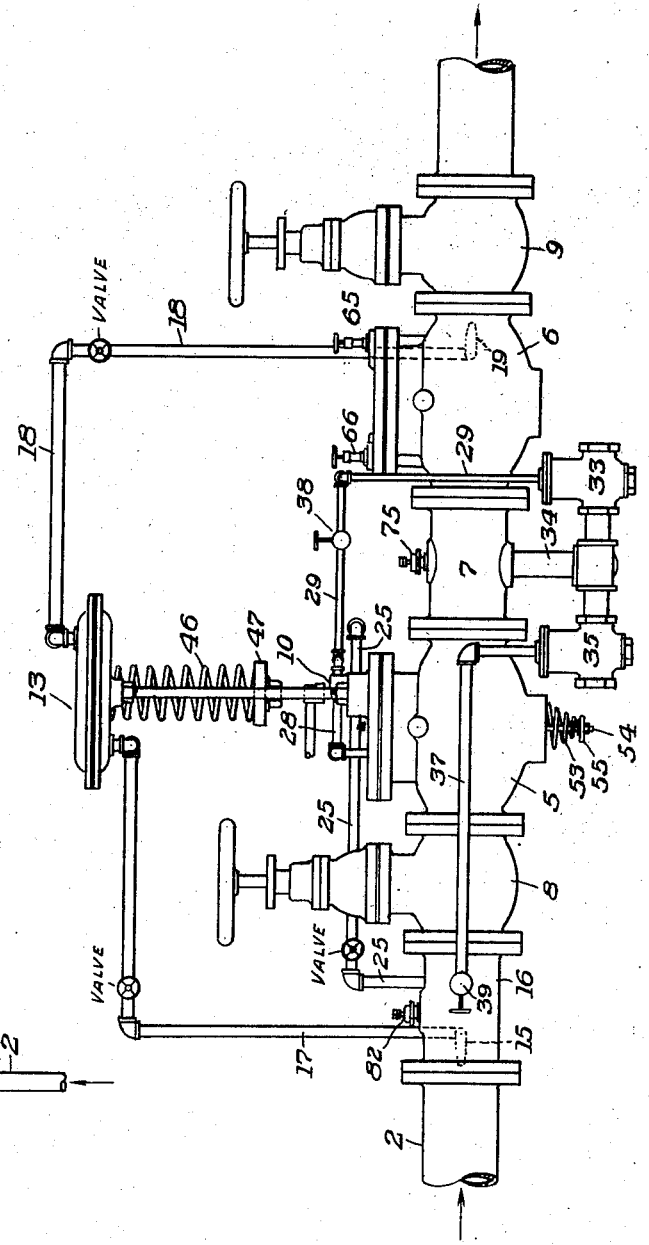
INVENTOR
Grant A. Colton
by Christy Parmelee and Strickland
his attorneys July 21, 1953   G. A. COLTON   2,646,064
VALVE APPARATUS
Filed Dec. 29, 1944   3 Sheets-Sheet 2
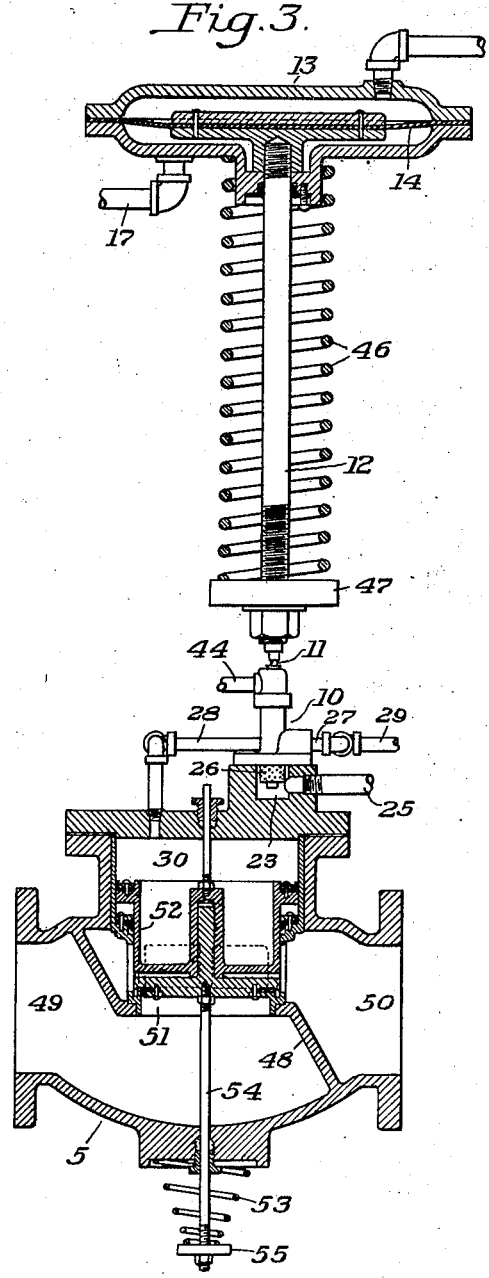
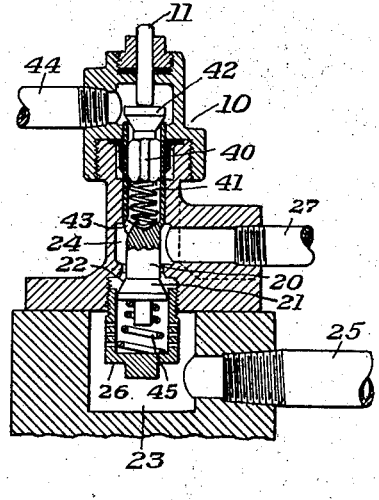
INVENTOR
Grant A. Colton
by Christy Parmelee and Strickland
his attorneys July 21, 1953  G. A. COLTON  2,646,064
VALVE APPARATUS
Filed Dec. 29, 1944  3 Sheets-Sheet 3
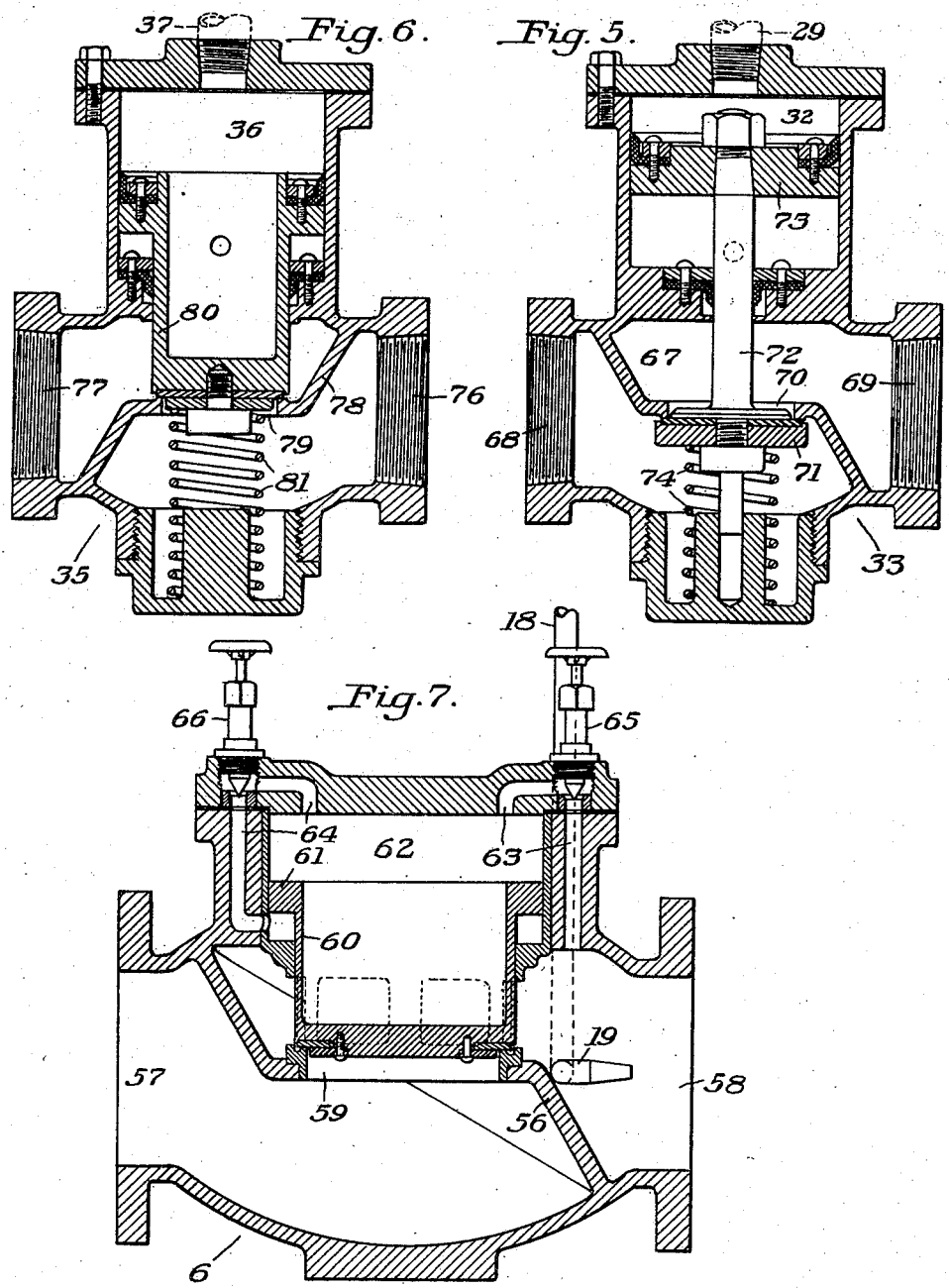
INVENTOR
Grant A. Colton
by Christy, Parmelee and Stickeland
his attorneys Patented July 21, 1953

2,646,064

UNITED STATES PATENT OFFICE 2,646,064

VALVE APPARATUS

Grant A. Colton, Gibsonia, Pa., assignor to Donald G. Griswold, Alhambra, Calif.

Application December 29, 1944, Serial No. 570,235

3 Claims. (Cl. 137—218)

My invention relates to hydraulic conduit systems, particularly, though not exclusively, to water supply systems in which a privately owned water supply line is connected to a municipal water supply line to meet the requirements of the consumer. The invention is directed to certain new and useful improvements in means which are automatically effective to prevent the entrance of water from the private supply line to the municipal supply line.

The invention consists in a novel combination of valves and control mechanism which is particularly effective to the obtainment of the ends in view.

The contamination of water in municipal supply systems has presented a great and growing problem. The contamination has been caused in many cases by consumers who have connected water lines from their own sources of supply to the municipal supply system for standby or supplemental service. For example, an office building, or a hotel, a department store, or an industrial plant, or the like, may have a private water supply system that meets part or all of its normal needs, but in order to supplement such supply, and/or to safeguard against lack of water in case of a failure of the private supply, a municipal line is connected to the lines of the private system. This practice is known in the art as the "cross-connection" of the water supply lines. Investigations have shown that such cross-connections frequently result in the water of a municipal system becoming contaminated by the water of a private supply system, the water of the private supply system usually not being as carefully treated and purified as that of the municipal system.

Another case of "cross-connection" may be noted: When a ship puts in at a dock connections are made to the local municipal water supply system to charge the ship's water tanks and bins, and to provide fresh water so long as the ship is in port. Docking ships always test their fire-extinguishing equipment when in port, and the fire pumps draw water from the ocean (or other navigable body of water), and pump it through their fire-fighting facilities. In many instances the pressure of the water from the fire pumps is greater than that existing in the local municipal supply system, whereby impure water infiltrates into the purified water of the municipal system.

The danger to public sanitation and health has been menaced to such an extent that the laws and ordinances of many states and municipalities now require the provision at all cross-connections to public water supply systems of means for preventing contamination. However, so far as I am aware no fully satisfactory means for such purpose has heretofore been made available to the public.

The invention will be understood upon reference to the accompanying drawings, in which:

Figure 1 is a fragmentary view illustrating diagrammatically a cross-connection between a private water supply system and a municipal system;

Figure 2 is a view in side elevation of valve apparatus embodying my invention;

Figure 3 is a view to larger scale and partly in vertical section and partly in side elevation of a valve and a control unit included in the apparatus;

Figure 4 is a view to still larger scale and in vertical section of a certain control valve embodied in the control unit;

Figures 5 and 6 are views to larger scale than Figure 1, showing in vertical section respectively two drain valves included in the apparatus; and Figure 7 is a view in vertical section of a check valve included in the apparatus.

Referring to Figure 1 of the drawings the reference numeral 2 indicates a municipal water supply conduit which is cross-connected to a second water supply conduit 3 which ordinarily will be a conduit leading from a private source of water supply. The conduit or line 3 will be understood to constitute the means for delivering the normal water demands of the consumer, with the municipal line 2 connected thereto for standby service. However, in some cases, the municipal line 2 may constitute the principal supply of the consumer, the line 3 providing a supplemental supply. In either case, the problem is the same; namely, to afford absolute safety, no matter what the conditions, that water from the line 3 (which may not be as thoroughly purified as the municipal water) shall enter the municipal conduit 2 and contaminate or mix with the water therein. To such end the valve apparatus of this invention is effective, and in Figure 1 the position in which the apparatus is preferably arranged is indicated by the bracket 4.

The valve apparatus comprises a piston valve 5 arranged in the line of flow from one water supply line to the other. The valve 5 is provided with means for automatically closing it, when conditions occur in the cross-connected lines that might result in the contamination of the water in one line by that in the other line. The apparatus also includes provision for venting a section of the conduit to the open atmosphere, and thereby establishing (as the valve closes) an air gap in the system. The apparatus is further adapted to flush-out the vented conduit section upon the reopening of the valve and before normal conditions of flow between the cross-connected water supply lines are re-established. Advantageously, if not essentially, the apparatus includes a second valve, 6, that is automatically operable in coordination with the valve 5. The two valves 5 and 6 are spaced apart in the line of flow in the conduit in which they are organized, with a conduit section 7 arranged between them. As will presently appear, it is the conduit section 7 that is vented to provide the air gap in or between the two supply lines when the valve 5 is closed.

It will be understood that my valve apparatus be readily adapted to serve in blocking or preventing the unintended admixture or contamination of other liquids than water in the two interconnected lines, and of other fluids than liquid, or of a liquid in one line and a gas in the other. In the present instance the invention is, as has already been noted, concerned with the prevention of a contaminating backflow of water from the private water line 3 into the municipal water line 2, and the description of the exemplary illustration the apparatus arranged for this purpose will suffice.

The valves 5 and 6 with the section of conduit 7 between them are arranged between the delivery end of the municipal supply line and the private supply line 3. On the upstream and downstream sides of the assembly 5, 6, 7 hand operated globe or gate valves 8 and 9 will ordinarily be provided, so that communication between the delivery end of line 2 and the valve apparatus and/or communication between the valve apparatus and the line 3 may be blanked when desired, regardless of the hydraulic conditions within the system of cross-connected conduits 2 and 3.

The means for automatically closing the valves 5 and 6, when there is danger of a contaminating flow from the line 3 into the line 2, comprise a pilot valve 10, whose stem 11 (Figures 3 and 4) is operated by means of the plunger rod 12 of a diaphragm unit 13. The diaphragm 14 of unit 13 is exposed on its under side to the hydraulic pressure prevailing in the municipal supply line 2 on the upstream side of the valve assembly, the means for transmitting the pressure comprising a pitot tube 15 extending into a special pipe fitting 16 arranged between the delivery end of the line 2 and valve 8, and a pipe 17 establishing communication between the pitot tube and the chamber beneath the diaphragm 14. On its upper side the diaphragm is subject to the hydraulic pressure prevailing on the downstream side of the valve apparatus, a pipe 18 communicating with a pitot tube 19 in the down-stream end of the valve 6 for the purpose. The mouth of the pitot tube 15 is directed in upstream direction, while the mouth of pitot tube 19 is positioned in downstream direction, and thus it is that the top and bottom faces of the diaphragm 14 are exposed to unequal pressures, the difference in pressures being dependent upon the hydraulic conditions of pressure and flow in the conduit system, as will be described below.

The pilot valve 10 includes a plunger 20 having at its lower end a head 21 co-operating with a seat 22 that controls a communication between valve chambers 23 and 24. Water under the pressure prevailing in the conduit 2 on the upstream side of the apparatus is delivered to the lower chamber 23 in the pilot valve by means of a pipe 25, and under certain conditions the water may have passage from the chamber 23, through a strainer 26 and the unseated valve head 21, into the chamber 24, and thence may flow through a pipe 27 to two branch pipes 28 and 29, the branch pipe 28 leading to the top of the piston chamber 32 in a drain valve 33 (cf. Figures 2 and 5) that closes one outlet of an "inverted T" drain 34 extending downward from conduit section 7 between valves 5 and 6. The opposite outlet of such T drain is equipped with an emergency drain valve 35 whose piston chamber 36 (Figure 6) is connected by a pipe 37 to the water in the upstream side of the apparatus. The pipes 29 and 37 leading to the drain valves 33 and 35, respectively, are provided with needle valves 38 and 39, whereby when there is flow through these pipes it may be restricted or regulated to the precise degree necessary to obtain the operations to be presently described.

The upper portion of the plunger 20 in the pilot valve 10 is hollow, and contains a valve element 40, together with a spring 41 that tends to thrust the valve element upward and force its head portion 42 from seated engagement with the peripheral edge of the hollow upper end of plunger 20. When the head portion of valve element 40 is unseated water under pressure in chamber 24 flows upward through a port 43 and the hollow portion of the plunger 20 to an outlet pipe 44, which may be connected to a drain or sewer. Normally, the valve plunger 20 is maintained at the upper end of its range of vertical movement, with the valve head 21 seated in closed position, by means of a spring 45, plus the effect of the upstream pressure of the water in chamber 23, and the valve stem 11 rests upon the top of valve element 42 but does not restrain the valve element 42 from opening (with the aid of spring 41 in this case) to permit a discharge flow of water through the pilot valve, as will presently be described. When the valve head 21 is seated there is no flow at all between chambers 23 and 24 within the pilot valve structure. The pressure of spring 45 may be suitably regulated by the screw-thread adjustment of the strainer 26 that contains it. A spring 46 is arranged to exert a downward thrust upon the plunger rod 12 of the diaphragm unit, and the effective pressure of this spring may be regulated by the screw-threaded adjustment of a follower block 47 on the rod. It will be perceived that the pressure exerted by the plunger rod 12 of the diaphragm unit upon the pilot valve stem 11 is the cumulative pressure of the spring 46 and the difference in hydraulic pressures acting on the opposite sides of the diaphragm 14, but this cumulative pressure is not effective to close valve element 42 of the pilot valve, nor to depress the plunger 20 and unseat valve head 21, until conditions promotive of backflow from conduit 3 to conduit 2 occur.

The valves 5 and 6 per se are of generally known construction in the art and are available on the market, wherefore they need not be minutely described in detail herein. Suffice it to mention that the valve 5 (Figure 3) includes a partition 48 between its inlet 49 and outlet 50; that a port 51 is formed in this partition; and that such port is adapted to be closed by the lower end of a hollow valve piston 52. The pressure of the water on the upstream side of the partition 48 is normally effective to hold the piston 52 raised from seat 51, so that normal flow through the valve may take place. However, the upper end of the piston 52 is larger in cross sectional area than the lower end, whereby if water from the upstream side of the valve is introduced into the piston chamber 39 (as indeed it is under conditions to be described) the piston is forced into closed position. A spring 53 acts downwardly upon a rod 54 connected to the piston 52, and the stress of this spring may, by adjustment of a device 55, be regulated externally of the valve, so that the hydraulic pressure applied to the top of the piston may be augmented to the degree necessary to provide the desired sensitivity and speed of piston movement.

Turing to Figure 7, the valve 6 includes a partition 56 between its inlet 57 and outlet 58; this partition includes a port 59 that is closed by the lower end of a plunger 60, while the upper end of the plunger is integrally formed with a piston head 61 which is vertically reciprocable in a cylinder 62 in the valve housing. A passage 63 establishes communication between the downstream side of the partition 56 and the chamber or cylinder 62 above the plunger 60 and piston head 61, while a passage 64 provides communication between such chamber and the annular region of the cylinder beneath the piston head. Normally, the higher presesure of the liquid on the upstream side of the partition is effective to hold the plunger lifted from its seat to permit flow through the valve. However, if the pressure on the upstream side of the partition 56 should drop below the pressure on the downstream side, such that there would, if not prevented, be a backflow through the valve, the plunger 60 is immediately moved into closed position under the effect of the then preponderant pressure applied through passage 63 upon the top of the plunger. In service the cylinder 62 is filled with water, so that the operation is almost instantaneous, and the displacement of water from beneath the piston head 61 and through the passage 64 is instrumental in dampening or retarding the closing movement of the plunger to the extent necessary to prevent a violent engagement of the plunger with the valve seat that surrounds the port 59. Needle valves 65 and 66 in the passages 63 and 64 provide for adjustment of the flow through said passages, whereby just the proper speed of valve movement may be obtained.

The drain valve 33 (Figure 5) includes a partition 67 between its inlet end 68, which is connected to one branch of the "inverted T" drain 34 (Figure 2), and its outlet end 69, which opens to the outer atmosphere or into a sewer pipe, not shown. The partition is provided with a port 70 adapted to be closed by a valve element 71 on a piston rod 72 carrying a piston 73 reciprocable in the cylinder or piston chamber 32. A spring 74, augmented by the pressure of the water normally prevailing in conduit section 7 and acting through inlet 68 on the under side of the portion 70, maintains the valve element 71 in seated or closed position. This is the condition which prevails when the valves 5 and 6 are open, and the municipal supply line 2 stands in open communication with the private supply line 3. If for any reason the pressure in the private supply line 3 should increase, or the pressure in the municipal supply line 2 should decrease, to a point where there is danger of back-flow from line 3 to line 2, the pressure differential acting on the diaphragm 14 is immediately effective (with the aid of the constant thrust of spring 46) to move the plunger rod 12 downward; the pilot valve stem 11 forces the pilot valve plunger 20 downward and unseats the valve element 21; water fed by pipe 25 from the upstream side of the apparatus flows through pipes 27, 28 and 29 to the valves 5 and 33; water at upstream pressure enters the cylinders 30 and 32 of said valves 5 and 33 and forces the pistons 52 and 73 downward, closing the port 51 in valve 5 and opening the port 70 in valve 33; and thus the valve 5 blocks flow, while valve 33 vents the conduit section 7 to the atmosphere or a drain. No sooner does the drain valve 33 open than the valve 6 closes, the accompanying drop in pressure on the upstream side of valve 6 depriving the under side of the plunger 60 of valve 6 of sufficient pressure to hold the valve open against the hydraulic pressure delivered through passage 63 from the downstream side of the apparatus. Thus, both valves 5 and 6 are then closed. The drain valve 33 remains open under the upstream pressure delivered through the pilot valve 10 and pipe 29. The conduit section 7 carries in its wall a vent valve 75 (Figure 2) which, normally held closed by water pressure within such conduit section, opens when the drain valve 33 opens to drain the water. The vent valve admits air into the conduit section, whereby the conduit section 7 is drained dry, and an air gap is formed between the valves 5 and 6, as well as between the municipal and private water supply lines 2 and 3.

The valves 5 and 6 remain closed until safe conditions are re-established in lines 2 and 3, conditions that make it impossible for water to infiltrate or flow from line 3 into line 2. When such conditions are re-established, the pressure differential on the diaphragm 14 is restored to normal value; the diaphragm rises, lifting the plunger rod 12 against the pressure of spring 46, and permitting the pilot valve plunger 20 to rise and close communication between the pipe 25 and pipes 27, 28 and 29. Accordingly, the supply of water from the upstream side of the apparatus is cut off from the cylinder chambers above the pistons 52 and 73 of valves 5 and 33. The piston in valve 5 immediately rises under the effect of the upstream pressure on its bottom, displacing water from the cylinder chamber 30, through pipes 28 and 27 and the pilot valve, the so discharged water flowing upward through port 43 in the plunger of the pilot valve, lifting the valve element 43 (with the aid of spring 41) from seated positon on the upper edge of the hollow plunger 20, and permitting the water to escape to the drain pipe 44. Thus, the valve 5 is opened and water from the municipal supply line 2 flows into the conduit section 7. It is important to note, however, that while the control pipe 29 of the drain valve 33 is opened through the pilot valve 10 to the drain pipe 44 simultaneously with the opening of the central pipe 28 of the main valve 5, the drain valve 33 does not reclose immediately with the re-opening of valve 5, but remains open, after the valve 5 is re-opened, for a sufficient interval of time to permit a flushing flow of water through the conduit section 7, whereby the conduit section is washed and scavenged of any water or material that may have seeped into it through valve 6. This retarded action of the drain valve 33 is obtained by means of the needle valve 38 in the pipe 29, the needle valve being adjusted to throttle the escape of water from above the piston 73 of the drain valve 33 to the extent necessary to hold the valve element 71 open for the flushing out of the conduit section 7. When, at length, sufficient water has been forced out through the pipe 29, by the piston 73, moving upward under the effect of spring 74, the valve element 71 returns to its seat and closes the drain valve. Thereupon, the conduit section 7 refills with water from the municipal supply line; the hydraulic pressure then acting upon the bottom of the plunger 60 in the valve 6 is adequate to overcome the hydraulic pressure acting upon the top of the plunger; the plunger moves upward with cushioned motion; flow is re-established through the valve; and open communication is reestablished for normal flow between the municipal and private supply lines 2 and 3.

It will be perceived that by adjustment of the tension of spring 46 of the diaphragm unit 13 the apparatus may be caused to operate in response to a predetermined hydraulic pressure differential between the upstream and downstream sides of the apparatus. As long as there is a flow of water from the municipal line 2 to the private line 3, there will be a sufficient velocity and pressure head effective on the nether face of the piston 52 of valve 5 to keep the valve open against the adjusted tension of spring 53. If there is a heavy demand by other consumers on the municipal supply line 2, such as will cause a dangerous drop in pressure in such line, or if there is an abnormal increase in pressure in the private supply line 3, such as may be occasioned by starting up delivery pumps in such line, the diaphragm unit will function immediately, and the several valves will operate in the manner described to block flow and establish an air gap between lines 2 and 3.

It remains to be noted that the emergency drain valve 35 provides an additional safeguard, in case the pressure in the municipal supply line 2 drops. Referring to Figure 6, valve 35 includes an inlet 76 connected to the left-hand branch (Figure 2) of the T drain 36, and an outlet 77 which opens to the atmosphere or is connected to a sewer or drain line. Between the inlet and outlet a partition 78 extends; the partition includes a port 79 closed from above by a piston 80. The pipe 37 (Figure 2) maintains water, under the pressure prevailing on the upstream side of the valve apparatus, upon the top of piston 80, and this pressure is effective, due to the larger area of the upper end of the piston, to hold the piston seated upon the port 79 against the pressure exerted upward on the piston by a spring 81 and the water beneath the partition 78. If the pressure of the water in the municipal supply line should fall, the spring and water pressure below the piston become effective. The piston rises and vents the conduit section 7, whereby the valve 6 is closed and the conduit section drained.

Another feature lies in the provision of a vent valve 82 in the line on the upstream side of the valve 5, and of manual valve 8 too, if the latter valve be provided as herein shown. The valve 82 is, as in the case of the valve 75, a known form of valve which remains closed when the pressure within the conduit exceeds atmospheric pressure externally of the conduit. The valve 82 is valuable in that it admits air into the delivery end of the municipal supply line 2, and thus prevents a vacuum forming therein, in case there be a break in the line, or in case the upstream demand of other consumers is so great that there is a tendency to draw water backward through the line from the delivery end.

In the foregoing specification and in certain of the appended claims the term, "municipal water supply conduit or line," is used to indicate a line for supplying water to the public—water that is in relatively pure or uncontaminated condition. It will be understood that the water supply line to be protected may be privately owned, and that the quoted term is intended to embrace any water or fluid conduit which is connected to a second conduit containing water or fluid which must be excluded from the first conduit for the reasons indicated.

I have described a presently preferred form of valve apparatus of my invention, and it will be understood that within the terms of the appended claims many variations and modifications in structure and organization are permissible without departing from the spirit of the invention.

I claim as my invention:

1. Valve apparatus for protecting the fluid in one of two interconnected conduits from contamination by the fluid in the other conduit, comprising a valve assembly having two valves arranged in sequence in the line of flow from one conduit to the other, means comprising a pilot valve and a pilot-valve-operating device responsive to a backflow-inducing difference in pressures between the upstream and downstream sides of the valve assembly for automatically closing one of said valves when conditions promotive of contamination occur, means for automatically closing the other of said valves in response to fluid pressure conditions created by the closing of the first valve, and means including a gravity drain and a drain valve subject to said pilot valve for establishing a vented region in the line of flow between the valves.

2. In a hydraulic supply system including two connected conduits, one arranged to deliver into the other, and two automatically operated flow-controlling valves arranged in tandem in the delivering conduit, the valve which is arranged upstream comprising a hydraulic plunger valve, the improvements herein described in means for inhibiting contamination comprising a gravity drain opening from the delivering conduit between said flow-controlling valves, a drain valve controlling said gravity drain, and hydraulically actuated means arranged externally of the line of flow through said delivering conduit for opening said drain valve when the pressure in the conduits on the downstream side of the flow-controlling valves increases relatively to the pressure on the upstream side to a value promotive of back flow through the valves, together with a second drain valve in said drain provided with means to open it when the pressure on the upstream side of said flow-controlling valves drops relatively to the pressure on the downstream side to a value promotive of backflow through the valves.

3. Valve apparatus for protecting the fluid in one of two interconnected conduits from contamination by back flow of the fluid in the other conduit, comprising a valve assembly having two valves arranged in succession in the line of flow from one conduit to the other, means for automatically closing said valves when conditions promotive of a contaminating back flow occur, a conduit section between said valves, means for removing fluid from said conduit section when said valves are closed comprising a vent and a vent valve, means for opening said vent valve when pressure on the downstream side of the valve assembly rises to a value promotive of backflow through the assembly, and a second vent valve arranged with means for opening it when the pressure on the upstream side of said valve assembly drops to a value promotive of backflow through the valve assembly.

GRANT A. COLTON.

References Cited in the file of this patent

UNITED STATES PATENTS

| Number | Name | Date |
| --- | --- | --- |
| 1,105,991 | Miller | Aug. 4, 1914 |
| 1,755,993 | Kelley | Apr. 22, 1930 |
| 1,960,144 | Entriken | May 22, 1934 |
| 2,146,204 | Dore | Feb. 7, 1939 |
| 2,310,586 | Lohman | Feb. 9, 1943 |
| 2,328,118 | Ahlport | Aug. 31, 1943 |
| 2,366,144 | Griswold | Dec. 26, 1944 |
| 2,372,940 | Ellis | Apr. 3, 1945 |